Aug. 7, 1962  F. M. RYCK ET AL  3,048,045
LINKAGE DRIVE FOR WINDSHIELD WIPERS
Filed Dec. 13, 1957  3 Sheets-Sheet 1

INVENTORS
FRANCIS M. RYCK
BY HARRY W. SCHMITZ

ATTORNEY

Aug. 7, 1962    F. M. RYCK ET AL    3,048,045
LINKAGE DRIVE FOR WINDSHIELD WIPERS
Filed Dec. 13, 1957                           3 Sheets-Sheet 3

INVENTORS
Francis M. Ryck
BY Harry W. Schmitz

M.H. Strickland
ATTORNEY

United States Patent Office 3,048,045
Patented Aug. 7, 1962

3,048,045
LINKAGE DRIVE FOR WINDSHIELD WIPERS
Francis M. Ryck and Harry W. Schmitz, Rochester, N.Y., assignors to General Motors Corporation, Detroit, Mich., a corporation of Delaware
Filed Dec. 13, 1957, Ser. No. 702,638
16 Claims. (Cl. 74—75)

This invention pertains to the art of mechanical movements, and particularly to a drive linkage including angle multiplying transmission assemblies for windshield wipers driven from rotary crank means.

It is well recognized that it is impossible to convert rotary motion of a crank to oscillation of a pair of wiper shafts and obtain the theoretically maximum angle of oscillation of the shafts with simple crank and pitman arrangements in a motor vehicle wiper installation, due to manufacturing tolerances and the relative locations of the rotary crank and the wiper pivot, or transmission, shafts. In actual practice, oscillation throughout an angle of 90° is the most desirable from an engineering standpoint, although the angle of oscillation can be increased to substantially 100° in some instances without reaching the dead center position of the linkage. However, if the configuration of the vehicle and the location of the pivot shafts is such that a wiper stroke of more than 100° is essential for adequate driver vision, some form of angle multiplying mechanism must be incorporated between the pivot shafts and the connecting links. Heretofore, it has been proposed to use gears having different pitch diameters for amplifying, or multiplying, the angle of oscillation imparted to a wiper shaft to prevent movement of the linkage to its dead center position. Such an arrangement is shown in the Whitted Patent No. 2,053,861.

The present invention relates to linkage type angle multiplying assemblies, and constitutes improvements over similar assemblies disclosed in copending applications S.N. 674,495, Schmitz et al. filed July 26, 1957, now Patent No. 3,010,136, and S.N. 686,432, Schmitz et al. filed September 26, 1957, now Patent No. 2,977,623, and both assigned to the assignee of this invention, in that the effective length of the drive arm does not vary so as to vary the applied torque. Accordingly, among our objects are the provision of wiper drive linkage means for imparting asymmetrical oscillation to a pair of spaced wiper shafts from a single crank means and means for increasing the motion between connecting links driven by a rotary crank and wiper shafts actuated by the connecting links; the further provision of a link type angle multiplying assembly designed to facilitate limited axial movement of the driven shaft; the further provision of a three element angle multiplying linkage assembly wherein the connecting link connection and the drive arm connection are substantially aligned; and the still further provision of a four element linkage type angle multiplier.

The aforementioned and other objects are accomplished in the present invention by locating the wiper pivot shaft between a stub shaft and the end of a drive arm. Specifically, the angle multiplying linkage assemblies disclosed herein may be used with windshield wiper actuating mechanism of the type set forth in the aforementioned application S.N. 686,432. However, reference to this type of actuating mechanism is only by way of example, and is not to be construed as a limitation.

In the disclosed embodiments, a pair of wipers are oscillated asymmetrically from a single crank means, that is a crank having a portion, or portions, extending on only one side of the rotary shaft. To accomplish this result, a motion reversing mechanism is incorporated on the passenger's side of the vehicle. Thus, the drive linkage for the passenger's side comprises a connecting link, a reversing link, or bellcrank, and a connecting arm, while the linkage for the driver's side merely includes a connecting link.

The pivot shafts for oscillating the wipers are rotatably journalled in housings suitably attached to the vehicle. In both linkage assembly embodiments disclosed herein, the pivot shafts are capable of limited axial movement relative to the housings, which axial movement is imparted to the pivot shaft automatically during oscillation thereof by a cam and cam follower arrangement which may be of the general type shown in Patent No. 2,806,557.

In the first embodiment, the multiplying linkage comprises an idle arm, a drive arm, a supporting arm and a yoke type drive link. The idle arm is connected at one end to a stub shaft rotatably journalled in the housing, the axis of the stub shaft being parallel to but spaced from the axis of the pivot shaft. The drive arm is rigidly connected to the pivot shaft, and the support arm is rotatably journalled on a bushing carried by the pivot shaft. The idle arm has a crank pin adapted for connection at its other end to either the reciprocating connecting arm on the passenger's side, or the reciprocating connecting link on the driver's side. The idle arm and the supporting arm are interconnected by a yoke type drive link, one end of which is rotatably supported on the crank pin of the idle arm. The yoke has a crank pin attached to one leg thereof, which crank pin extends through an aperture in the other leg thereof and is rotatably journalled in the idle arm. The drive arm has a bushing through which the crank pin of the yoke extends. Since the pivot shaft is disposed between the stub shaft and the end of the drive arm, reciprocation of the connecting arm on the passenger's side, or connecting link on the driver's side, will impart oscillation to the idle arm, and the drive arm will be driven by the drive link through an angle greater than the angle of oscillation of the idle arm. The angle of multiplication is determined by the distance between the axis of the stub shaft and the pivot shaft.

In the preferred embodiment, the link type angle multiplier comprises a triangularly shaped idle arm, a drive arm and a drive link. The drive arm is attached to the pivot shaft rotatably journalled and slidably mounted in the housing. The idle arm is rigidly attached to a stub shaft journalled in the housing and spaced from the pivot shaft. The idle arm has a ball stud extending from one side thereof and a pin extending from the other side thereof on the driver's side, and a pair of pins extending in opposite directions on the passenger's side. The connecting elements on the idle arms are located equal radial distances from the axis of the stub shaft. The connecting arm has a hub and a pin extending from one side thereof, the hub of which slidably receives the pin on the idle arm, and the pin of which is slidably received by the drive arm. The connections between the idle arm and connecting link and/or arm, and the drive link and drive arm, are in substantial alignment. Since the axes of the stub shaft and the pivot shaft are spaced apart, the angle of oscillation imparted to the drive arm will be greater than the angle of oscillation imparted to the idle arm. Moreover, the sliding connection between the drive arm pin and the hub on the connecting link permits limited axial movement of the pivot shaft.

Further objects and advantages of the present invention will be apparent from the following description, reference being had to the accompanying drawings, wherein preferred embodiments of the present invention are clearly shown.

In the drawings:
FIGURE 1 is a schematic view of a windshield wiper drive linkage constructed according to one embodiment of this invention viewed from inside of a vehicle.

Figure 1:
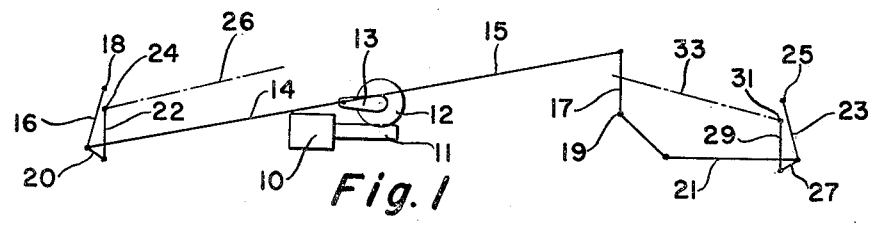

With particular reference to FIGURE 1, a windshield wiper drive linkage is depicted as being driven by an electric motor 10, the shaft of which has a worm 11 meshing with a worm gear 12. The worm gear 12 carries a single crank arm assembly 13 to which the inner ends of connecting links 14 and 15 are rotatably connected. Structurally, the crank arm assembly 13 may be of the type shown in Serial No. 686,432, aforementioned. The outer end of connecting link 14 is rotatably connected to an idle arm 16 having a fixed shaft, or stub shaft 18. The idle arm 16 is connected by a drive link 20 to a drive arm 22. The drive arm is attached to a wiper pivot shaft 24, to which a wiper arm 26 for the driver's side, is connected.

The outer end of the connecting link 15 is rotatably connected to one end of a bellcrank 17 having a fixed intermediate pivot 19. The other end of the bellcrank 17 is pivotally connected to a connecting arm 21, the connecting arm 21 also being pivotally connected to an idle arm 23 for the passenger's side of the vehicle. The idle arm 23 is attached to a stub shaft 25, and is connected by a drive link 27 with a drive arm 29. The drive arm 29 is rigidly attached to a wiper pivot shaft 31 which carries a wiper arm 33 for the passenger's side of the vehicle. A drive arrangement of this general type except for the specific angle multiplying linkage assemblies is shown in the aforementioned copending application Serial No. 686,432.

Figure 2:
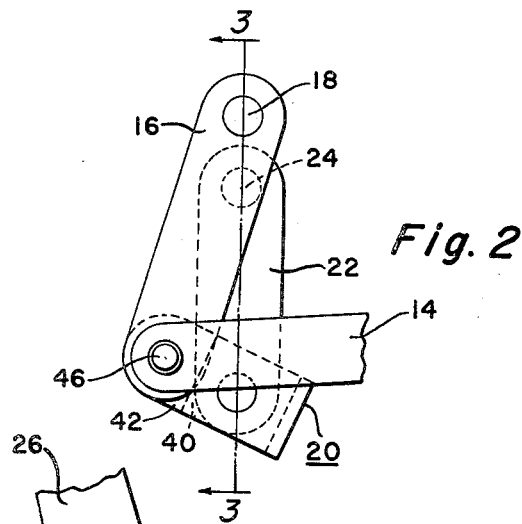
FIGURE 2 is a fragmentary view in elevation, depicting an angle multiplying linkage assembly constructed according to one embodiment of this invention.
Figure 3:
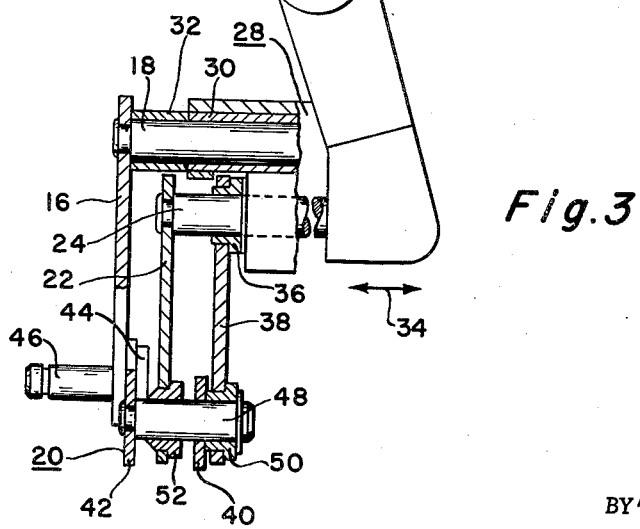
FIGURE 3 is a fragmentary view, partly in section and partly in elevation, taken along line 3—3 of FIGURE 2.

With particular reference to FIGURES 2 and 3, the angle multiplying linkage assembly for the driver's side of the vehicle is supported by a transmission housing, or bracket, 28 which is suitably attached to the vehicle. The stub shaft 18 is rotatably supported by a sleeve bearing 30 within the housing 28, the stub shaft 18 being restrained against axial movement to the left, as viewed in FIGURE 3, by a snap ring, not shown. The stub shaft 18 is likewise restrained against axial movement to the right, as viewed in FIGURE 3, by a bushing 32 interposed between the idle arm 16 and the sleeve bearing 30. As seen in FIGURE 3, the stub shaft 18 is riveted to the idle arm 16.

The wiper pivot shaft 24 is likewise rotatably journalled in the housing 28, but the shaft 24 is capable of axial movement relative to the housing 28 in the directions of arrows 34. Wiper arm 26 is drivingly connected with the outer end of the pivot shaft 24, and the drive arm 22 is rigidly connected to the inner end of the pivot shaft 24. The pivot shaft 24 also supports a bushing 36, about which a supporting arm 38 is rotatably journalled. The axes of the shafts 18 and 24 are parallel but spaced from each other as clearly shown in FIGURES 2 and 3. Moreover, the pivot shaft 24 is located between the stub shaft 18 and the drive link 20 which interconnects the idle arm 16 and the drive arm 22 whereby any angular movement imparted to the idle arm 16 will be amplified and imparted to the drive arm 22 and pivot shaft 24. In other words, the radial distance between the wiper shaft 24 and the drive link is less than the radial distance between the stub shaft 18 and the drive link.

In the embodiment of FIGURES 2 and 3, the drive link is in the form of a yoke having arms 40 and 42 of different lengths. The longer leg, namely leg 42 is rotatably journalled on a bushing 44 carried by a crank pin 46 attached to the idle arm 16. The shorter leg 40 is apertured and receives a pin 48 riveted to the longer leg 42, and passing through a bushing 50 carried by the support arm 38. The pin 48 also extends through a bushing, or bearing aperture, 52 carried by the drive arm 22. The reciprocable connecting link 14 is rotatably connected to the pin 46 of the idle arm 16.

The sliding connection between the bushing 52 and the pin 48 permits the drive arm 22 and the pivot shaft 24 to move axially in the direction of arrow 34, the limits of movement being determined by engagement of the bushing 52 with the legs 40 and 42 of yoke type drive link 20. Axial movement may be imparted to the shaft 24 by a cam and cam follower arrangement of the general type shown in the aforementioned Patent No. 2,806,557. As will be apparent from an inspection of FIGURE 2, during reciprocation of the link 14 which is rotatably connected to pin 46, the idle arm 16 will be oscillated throughout an angle indicated by X, while the drive arm 22 will be driven throughth the drive link 20 throughout a greater angle, namely Y.

Figure 4:
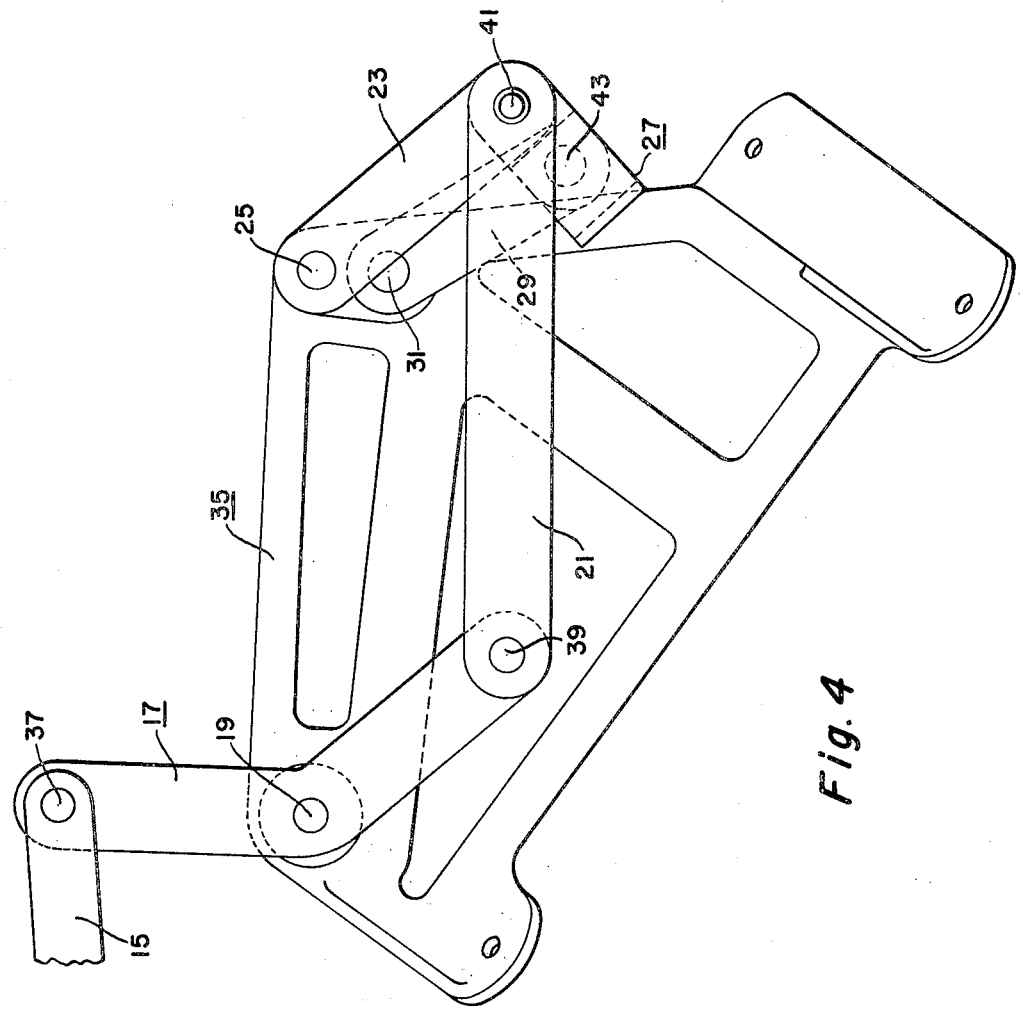
FIGURE 4 is a fragmentary view, in elevation, of motion reversing mechanism associated with the pivot shaft assembly for the passenger's side of the vehicle.

With reference to FIGURE 4, the transmission assembly associated with the passenger's side of the vehicle includes a motion reversing mechanism since the crank assembly 13 extends on only one side of the axis of the worm gear 12, it is desired to oscillate the blades and arms asymmetrically, and there is insufficient space in the vehicle to have the connecting link 15 extend above the shaft 31 at the transmission assembly. Accordingly, the passenger's side of the transmission assembly includes a transmission housing, or bracket, 35. The bellcrank 17 is rotatably journalled on a fixed shaft 19 carried by the bracket 35. The outer end of the connecting link is rotatably connected to a pin, or ball stud, 37 attached to the upper end of the bellcrank 17. The connecting arm 21 is rotatably connected to a pin 39 attached to the inner end of the bellcrank 17. The other end of the connecting arm 21 is connected to a pin 41 attached to the idle arm 23.

The idle arm, the drive arm, the support arm, and the yoke type drive link associated with the passenger's side of the vehicle are identical with like parts of the driver's side of the vehicle. Hence, the pivot shaft 31 is rotatably journalled in the bracket 35 and is capable of limited axial movement relative thereto. The stub shaft 25 is disposed above the pivot shaft 31 and is restrained against axial movement. The yoke type drive link 27 carries a pin 43 upon which the drive arm 29 is slidably mounted. Likewise, the pin 43 extends through a bushing in the support arm, not shown, for the passenger's side transmission assembly. Accordingly, during reciprocation of the link 15, angular movement will be imparted to the bellcrank 17 so as to impart reciprocable movement to the connecting arm 21 which will impart angular movement to the idle arm 23, which angular movement will be amplified and imparted to the drive arm 29 and pivot shaft 31 through the drive link 27 so that the arms 26 and 33 will be oscillated over asymmetrical paths across the outer surface of a windshield.

Figure 5:
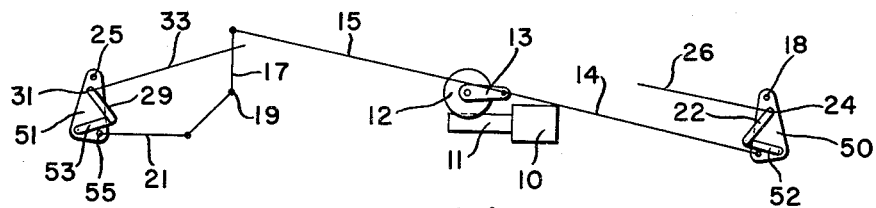
FIGURE 5 is a schematic view of a modified windshield wiper drive linkage viewed from the outside of the vehicle.
Figure 7:
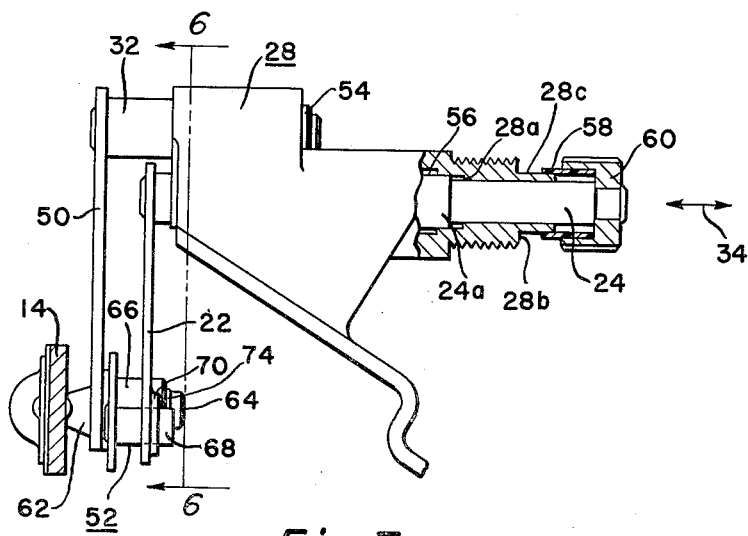
FIGURE 7 is a view partly in section and partly in elevation, illustrating a pivot shaft assembly having a preferred type angle multiplying linkage.

With particular reference to FIGURES 5 and 7, the preferred type of angle multiplying linkage assembly will be described, wherein similar numerals denote similar parts throughout the several views as aforedescribed. Thus, in the preferred system the connecting link 14 for the driver's side is rotatably connected to a triangularly shaped idle arm 50 attached to a stub shaft 18 on the driver's side. The wiper pivot shaft 24 is attached to the drive arm 22. The drive arm 22 and the idle arm 50 are connected by a drive link 52.

Similarly, on the passenger's side, the connecting arm 21 is pivotally connected to triangularly shaped idle arm 51 which is connected to the stub shaft 25. The wiper pivot shaft 31 is connected to the drive arm 29, and the arms 29 and 51 are interconnected by drive link 53.

Figure 6:
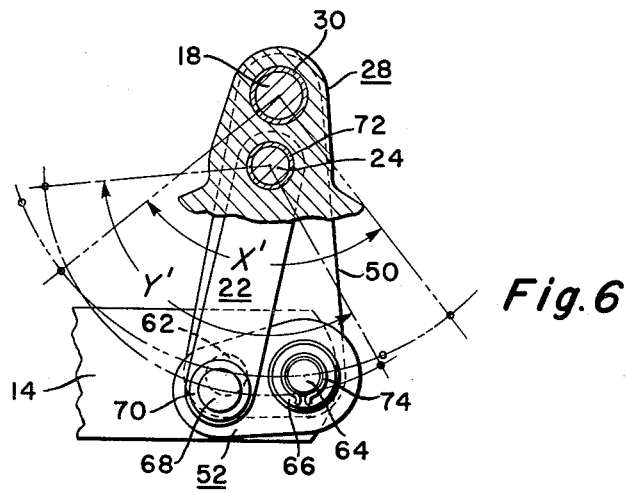
FIGURE 6 is a fragmentary view, partly in section and partly in elevation, taken along line 6—6 of FIGURE 7.

As seen in FIGURES 6 and 7, the transmission assembly for the driver's side includes a housing 28 within which the stub shaft 18 is journalled by a sleeve bearing 30. The stub shaft 18 is restrained against axial movement to the left as viewed in FIGURE 7 by a retaining ring 54, and is restrained against axial movement to the right as viewed in FIGURE 7 by a bushing 32 which is confined by the idle arm 16 and the housing 28. The pivot shaft 24 is rotatably journalled in the housing 28 by spaced bushings, one of which 56 is shown in FIGURE 7, and the other of which 72 is shown in FIGURE 6. The shaft 24 can slide axially relative to the housing 28 in the direction of arrows 34, movement to the right being limited by engagement of a shoulder 24a on the shaft with an internal shoulder 28a in the housing, and movement of the shaft 24 to the left being limited by engagement between the end of a weather skirt 58 and the external shoulder 28b of the housing 28. The weather skirt 58 slidably engages a reduced extension 28c of the housing in a telescopic manner, and is brazed, or otherwise suitably secured to a serrated drive burr 60 attached to the shaft 24. The drive arm 22 is rigidly attached to the inner end of the shaft 24. The idle arm 50 is of triangular configuration as shown in FIGURE 6, and has a ball stud 62 attached thereto and extending in one direction and a pin 64 extending therefrom in the other direction, these connecting elements being the same radial distance from the axis of the stub shaft. The drive link 52 has a hub 66 and a pin 68 extending from the same side thereof. The hub 66 receives the pin 64, and the pin 68 extends through a bearing aperture 70 formed on the drive arm 22. The connection between the hub 70 and the drive 22 and the pin 68 permits axial movement of the shaft 24, as aforedescribed. The hub 68 is restrained against axial movement relative to the pin 64 by snap ring 74.

As seen particularly in FIGURE 6, the connecting link 14 is connected to the ball stud 62, the points of connection between the link 14 and the idle arm 50 being in substantial alignment with the connection between the drive link 52 and the drive arm 22. The reason for locating these two points of connection in substantial alignment, or as close together as possible, is to reduce the distortion of the movement imparted to the drive arm 22 during oscillation of the idle arm 50 by reciprocation of the connecting link 14. As the connections between the idle arm 50 and the link 14 and the drive arm 22 and the drive link 52 are displaced, the distortion, or in other words, the nonuniformity of angular velocity, of the drive arm relative to the idle arm increases.

The transmission assembly for the passenger's side is identical to that of the driver's side except for the fact that the idle arm 51 does not have a ball stud thereon as does the idle arm 50. In place thereof, the idle arm 51 has a pin 55 to which the arm 21 is pivotally connected. The bellcrank 17 has a ball stud connection with the connecting link 15 permitting limited universal movement, as does the ball and socket connection between the connecting link 14 and the idle arm 50.

Operation of the preferred type multiplier linkage is depicted in FIGURE 6, from which it can be seen that when the idle arm 50 is oscillated throughout an angle X' by reciprocation of the connecting link 14, the drive arm 22 and its shaft 24 will be oscillated through an angle Y', the angle Y' being greater than the angle X'. Moreover, by reason of having the pivotal connections between the link 14 and the idle arm 50, and the drive arm 22 and the drive link 52, in substantial alignment, the angular velocity of the drive arm 22 will be substantially the same as the angular velocity of the idle arm 50. Moreover, since the crank assembly 13 is at its maximum throw position at opposite ends of the stroke, the angular velocity of the idle arm 50 and the drive arm 22 will automatically be a minimum at the stroke ends and a maximum at the middle of the stroke.

From the foregoing it is apparent that the present invention discloses simple linkage arrangements for amplifying angular motion as derived from a reciprocating link. Moreover, the angle multiplying linkage assembly of this invention eliminates the sliding connections required in the angle multiplying assemblies disclosed in the aforementioned copending applications, which resulted in torque variations due to the variable effective lengths of the drive arms.

This invention is related to copending application Serial No. 702,689 filed of even date herewith in the name of Fox et al. and assigned to assignee of this invention.

While the embodiments of the invention as herein disclosed constitute preferred forms, it is to be understood that other forms might be adopted.

What is claimed is as follows:

1. A linkage drive for imparting asymmetrical oscillation to a pair of spaced wiper shafts from a rotary drive member having crank means on only one side of the axis thereof, including, a pair of connecting links having their inner ends rotatably connected to said crank means, a pair of spaced wiper shafts, a drive arm attached to each wiper shaft, the outer end of one of said connecting links being operatively connected with one of said drive arms, a motion reversing link having a fixed intermediate pivotal support, the outer end of the other connecting link being rotatably connected to one end of said reversing link, and an arm operatively interconnecting the other end of said reversing link and said other drive arm whereby rotation of said crank means will impart asymmetrical oscillation to said wiper shafts.

2. A linkage drive for imparting asymmetrical oscillation to a pair of spaced wiper shafts from a rotary drive member having crank means on only one side of the axis thereof, including, a pair of connecting links having their inner ends rotatably connected to said crank means, a pair of spaced wiper shafts, a bracket for rotatably supporting each wiper shaft, a stub shaft rotatably supported in each bracket, the axis of the stub shaft being parallel to but spaced from its respective wiper shaft, an idle arm connected to each stub shaft, a drive arm connected to each wiper shaft, a drive link pivotally interconnecting the respective idle arms and drive arms, the outer end of one of said connecting links being pivotally connected to one of said idle arms, a bellcrank having intermediate pivotal support in one of said brackets, the other end of the other connecting link being pivotally connected to one end of said bellcrank, and a connecting arm pivotally interconnecting the other end of said bellcrank and said other idle arm whereby rotation of said crank means will impart asymmetrical oscillation to said idle arms, the radial distance between each wiper shaft and its respective drive link being less than the radial distance between each stub shaft and its respective drive link whereby oscillation of the idle arms throughout a stroke of predetermined amplitude will effect oscillation of said drive arms and said wiper shafts throughout a stroke of greater amplitude through said drive links.

3. The linkage drive set forth in claim 2 wherein said wiper shafts are slidably supported for axial movement relative to said brackets, and wherein the connection between each drive arm and its drive link comprises a pin on said drive link which extends through a bearing aperture of its drive arm.

4. The drive linkage set forth in claim 2 wherein the connections between the outer end of said one connecting link and its respective idle arm is in substantial alignment with the connection between the drive link and its respective drive arm, and the connection between the connecting arm and the other idle arm is in substantial alignment with the connection between the other drive link and its respective drive arm.

5. The drive linkage set forth in claim 2 wherein each wiper shaft rotatably supports a supporting arm, and wherein each drive link is in the form of a yoke, one leg of which is rotatably connected to its respective idle arm and the other leg of which is supported by a pin passing through the bearing aperture of said drive arm and rotatably supported in said support arm.

6. A movement amplifying transmission assembly for windshield wipers including, a bracket, a wiper shaft rotatably supported in said bracket, a drive arm attached to said shaft, a stub shaft rotatably supported in said bracket, the axis of said stub shaft being parallel to but spaced from the axis of said wiper shaft, an idle arm attached to said stub shaft, a support arm journalled for rotation about the axis of said wiper shaft, and a drive link carried by said support arm and pivotally connected to said drive arm and said idle arm, the radial distance between the wiper shaft and the drive link being less than the radial distance between said stub shaft and said drive link, whereby oscillation of the idle arm throughout a stroke of predetermined amplitude will effect oscillation of said drive arm and said wiper shaft throughout a stroke of greater amplitude.

7. The movement amplifying transmission assembly set forth in claim 6 wherein said drive link is in the form of a yoke, a pin attached to one leg of the yoke and extending through the other leg thereof, said one leg being pivotally connected to said idle arm, said pin being rotatably supported in said support arm, and wherein said drive arm has a bearing aperture through which said pin extends.

8. The movement amplifying transmission assembly set forth in claim 7 wherein said wiper shaft is supported for axial movement relative to said bracket, and wherein said pin is slidably received in the bearing aperture of said drive arm.

9. An angle multiplying linkage assembly including, a housing, an output shaft rotatably journalled in the housing, a stub shaft rotatably journalled in the housing, an idle arm connected to said stub shaft, a drive arm connected to said output shaft, a support arm rotatably supported on said output shaft, and a drive link carried by said support arm and pivotally connected to said idle and said drive arms, the radial distance between said output shaft and said drive link being less than the radial distance between said stub shaft and said drive link whereby oscillation of said idle arm will be multiplied and applied to said drive arm through said drive link.

10. The linkage assembly set forth in claim 9 wherein said drive link is in the form of a yoke having legs of different length, a pin attached to the longer leg, extending through an aperture in the shorter leg and rotatably supported in said support arm, the longer leg being rotatably connected to said idle arm, the drive arm having a bearing aperture through which said pin extends.

11. The linkage assembly set forth in claim 9 wherein said stub shaft is restrained against axial movement while said output shaft is supported for axial movement relative to the housing, and wherein the pivotal connection between said drive link and said drive arm includes a pin attached to said drive link and slidably received in a bearing aperture of said drive arm.

12. A linkage drive for imparting asymmetrical oscillation to a pair of spaced wiper shaft from a rotary drive member having a crank arm assembly extending from only one side of the axis of the said rotary drive member, including, a pair of connecting links having their inner ends rotatably connected to said crank assembly, a pair of spaced wiper shafts, a drive arm attached to each wiper shaft, the outer end of one of said connecting links being operatively connected with one of said drive arms, a bellcrank having a fixed intermediate pivotal support, the outer end of the other connecting link being rotatably connected to one end of said bellcrank, and an arm operatively interconnecting the other end of said bellcrank and said other drive arm whereby rotation of said crank assembly will impart asymmetrical oscillation to said wiper shafts.

13. A linkage drive for imparting asymmetrical oscillation to a pair of spaced wiper shafts from a rotary drive member having a crank assembly extending from only one side of the axis of the drive member, including, a pair of connecting links having their inner ends rotatably connected to said crank assembly, a pair of spaced wiper shafts, a bracket for rotatably supporting each wiper shaft, a stub shaft rotatably supported in each bracket, the axis of the stub being parallel to but spaced from its respective wiper shaft, an idle arm connected to each stub shaft, a drive arm connected to each wiper shaft, a drive link pivotally interconnecting the respective idle arms and drive arms, the outer end of one of said connecting links being pivotally connected to one of said idle arms, a reversing link having an intermediate pivotal support in one of said brackets, the other end of the other connecting link being pivotally connected to one end of said reversing link, and a connecting arm pivotally interconnecting the other end of said reversing link and said other idle arm whereby rotation of said crank assembly will impart asymmetrical oscillation to said idle arms, the radial distance between each wiper shaft and its respective drive link being less than the radial distance between each stub shaft and its respective drive link whereby oscillation of the idle arms throughout a stroke of predetermined amplitude will effect oscillation of said drive arms and said wiper shafts throughout a stroke of greater amplitude through said drive links.

14. A windshield wiper drive assembly comprising a bracket, a windshield wiper drive shaft rotatably supported in said bracket, a drive arm having one end secured to said shaft for pivotal movement of said drive arm about the axis of said shaft, an idle arm having an end pivotally connected to said bracket for pivotal movement of said idle arm relative to said bracket, a drive link pivotally connected at one point thereon to the free end of said idle arm and pivotally connected at another point thereon to the free end of said drive arm, the distance between the two pivot points of said drive link being less than the distance between the two pivot points of said idle arm and less than the distance between the two pivot points of said drive arm, and a member pivotally connected to said idle arm toward the free end thereof to impart to and fro motion to said idle arm relative to said bracket, the relative positions of the idle arm-to-bracket pivotal connection, the idle arm-to-drive link pivotal connection and the idle arm-to-member pivotal connection defining a triangle in the plane of to and fro moton of said idle arm, said triangle having two legs of substantially equal length, and the radial distance from the drive shaft to the drive link being less than the radial distance from the pivotal connection of the idle arm with the bracket to the drive link whereby to and fro movement of the idle arm through a predetermined angle will cause said drive arm and said drive shaft to be rotated to and fro through a greater angle.

15. A windshield wiper drive assembly as set forth in claim 14 wherein the pivotal connection between said member and said idle arm is substantially aligned with the pivotal connection between said drive link and said drive arm when the idle arm is in the mid-position of its to and fro movement.

16. A windshield wiper drive assembly comprising a bracket, a windshield wiper drive shaft rotatably supported in said bracket, a drive arm having one end secured to said shaft for pivotal movement of said drive arm about the axis of said shaft, a stub shaft supported by said bracket with its axis parallel to but spaced from the axis of said drive shaft, an idle arm having an end supported by said stub shaft for pivotal movement of said idle arm about the axis of said stub shaft, a drive link pivotally connected at one point thereon to the free end of said idle arm and pivotally connected at another point thereon to the free end of said drive arm, and a member pivotally connected to said idle arm at the free end thereof to impart to and fro movement to said idle arm relative to said bracket, the two pivotal connections at the free end of the idle arm being spaced from each other in the plane of the to and fro movement of the idle arm and being substantially the same radial distance from the stub shaft, the radial distance from the drive shaft to the drive link being less than the radial distance from the stub shaft to the drive link whereby to and fro movement of the idle arm through a predetermined angle will cause said drive arm and said drive shaft to be rotated to and fro through a greater angle.

References Cited in the file of this patent

UNITED STATES PATENTS

| | | |
|---|---|---|
| 304,048 | Tripp | Aug. 26, 1884 |
| 2,395,768 | Svoboda | Feb. 26, 1946 |
| 2,594,085 | Smith | Apr. 22, 1952 |
| 2,782,453 | Schlage | Feb. 26, 1957 |
| 2,895,158 | Riester | July 21, 1959 |

FOREIGN PATENTS

| | | |
|---|---|---|
| 716,825 | Germany | Jan. 30, 1942 |
| 1,013,136 | France | Apr. 30, 1952 |